United States Patent [19]

Lemoussu

[11] 4,275,465
[45] Jun. 23, 1981

[54] CLOCK RATE RECOVERY CIRCUIT

[75] Inventor: Michel Lemoussu, Saint Michel sur Orge, France

[73] Assignee: Compagnie Industrielle des Telecommunicators Cit-Alcatel, Paris, France

[21] Appl. No.: 89,390

[22] Filed: Oct. 30, 1979

[30] Foreign Application Priority Data

Nov. 7, 1978 [FR] France .................. 78 31466

[51] Int. Cl.³ .................. H04B 1/10; H03K 9/02
[52] U.S. Cl. .................. 375/97; 375/58; 375/118
[58] Field of Search .................. 375/97, 58, 38, 120, 375/118; 370/20, 6; 455/60

[56] References Cited

U.S. PATENT DOCUMENTS

| 3,993,956 | 11/1976 | Gilmore et al. | 375/118 |
| 4,105,975 | 8/1978 | Sanders et al. | 375/118 |
| 4,137,427 | 1/1979 | Choquet et al. | 375/118 |

*Primary Examiner*—Glen R. Swann, III

*Attorney, Agent, or Firm*—Kenyon & Kenyon

[57] ABSTRACT

There is a need to recover the clock rate from a received and demodulated binary data signal in order to properly decode the received data. Unfortunately some linear modulation systems used for transmission have the effect of ensuring that there is substantially no frequency component in the received signal at the desired clock rate. Non-linear processing of the received signal (e.g. by a rectifier circuit) is therefore necessary to recover the clock. A simple rectifier circuit system is sensitive to the phase difference between the transmitter and receiver carrier waves. The present recovery circuit (10) requires a quadrature demodulator (9) to provide in-phase and quadrature versions $x_1(t)$ and $x_2(t)$ of the received demodulated data signal. Two parallel chains of rectifier circuit (30,31), on/off limiter (32,33), multiplier (34,35) and low pass filter (36,37) act separately on the said versions. Whatever the carrier phase difference, one or other of the chains gives an adequate control signal for a VCO (39). These control signals are summed at (38).

3 Claims, 4 Drawing Figures

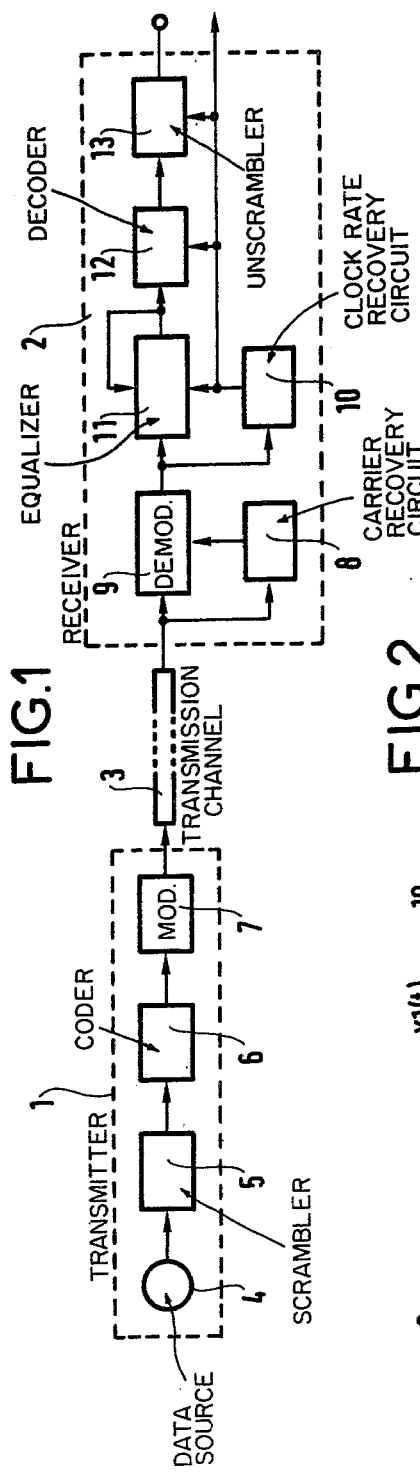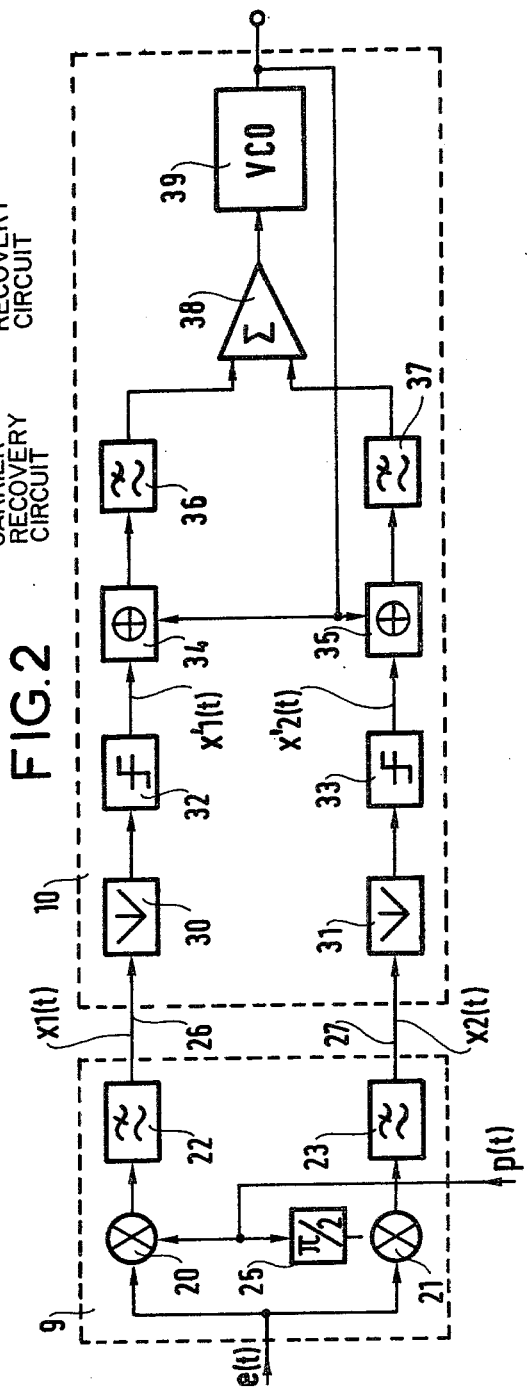

CLOCK RATE RECOVERY CIRCUIT

BACKGROUND OF THE INVENTION

The present invention relates to data transmission. It concerns the recovery at a receiver of a clock rate from a synchronous digital signal transmitted using linear modulation.

In a data transmission system using linear modulation, a synchronous binary signal is shaped by a coder before being modulated and transmitted. This shaping is to limit the pass band of the transmitted signal, and it transforms the synchronous binary signal into a signal having a plurality of levels giving a spectrum without any component at the clock rate, so that it is not possible to recover the clock rate at a receiver simply by filtering the received and demodulated signal, and it is necessary to use non-linear processing of the demodulated signal.

Clock rate recovery circuits are known comprising an oscillator which is centred on the clock rate frequency and is servo-controlled by a phase locked loop operating on the output signal from a full-wave rectifier circuit which receives the demodulated signal. Such circuits have the drawback of tolerating only a small phase difference between the carriers of the transmitter and of the receiver.

SUMMARY OF THE INVENTION

The present invention aims to avoid this drawback.

The present invention provides a clock rate recovery circuit for a data transmission system using linear modulation and including a receiver with a synchronous demodulator having two carriers in quadrature and two outputs; namely an in-phase output and a quadrature output. The clock rate recovery circuit comprises:

a first rectifier connected to the in-phase output of the demodulator;

a second rectifier connected to the quadrature output of the demodulator;

a first two-input/one-output multiplier having one of its inputs connected to the output of the first rectifier and its other input connected to the output of a voltage-controlled oscillator which supplies the recovered clock rate frequency;

a second two-input/one-output multiplier having one of its inputs connected to the output of the second rectifier and its other input connected to the output of the said voltage-controlled oscillator which supplies the recovered clock rate frequency;

a first low pass filter connected to the output of the first multiplier;

a second low pass filter connected to the output of the second multiplier;

a two-input/one-output summing circuit having one of its inputs connected to the output of the first low pass filter and its other input connected to the output of the second low pass filter; and the said voltage-controlled oscillator having a control input connected to the output of the summing circuit and an output delivering a signal at the frequency of the recovered clock rate and connected to one of the inputs of both the first and the second multipliers.

In a preferred embodiment, the rectifiers comprise full wave rectifiers, on/off limiters are inserted between the rectifiers, and logic "exclusive-or" gates are used as the multipliers.

BRIEF DESCRIPTION OF THE DRAWING

An embodiment of the invention suitable for use in a data transmission system using single sideband amplitude modulation is described by way of example with reference to the accompanying drawings in which:

FIG. 1 is an overall block diagram of a data transmission system using single side band amplitude modulation;

FIG. 2 is a block diagram of a clock rate recovery circuit in accordance with the invention as used in the receiver part of the transmission system shown in FIG. 1.

DESCRIPTION OF THE PREFERRED EMBODIMENT

Figure 3:
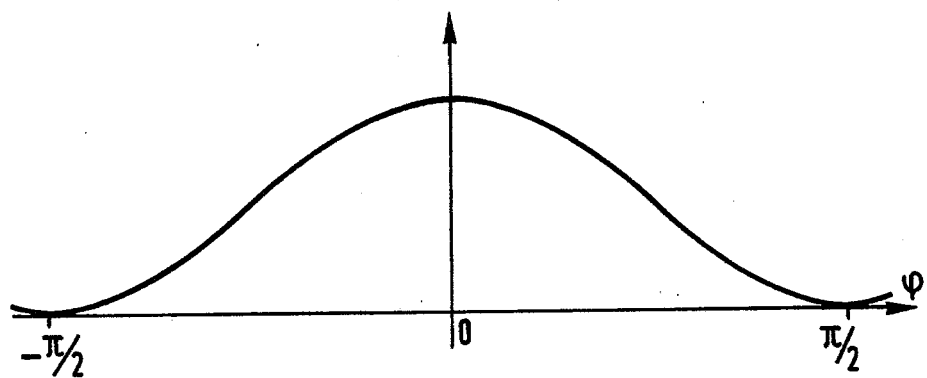
FIGS. 3 and 4 are graphs for explaining the operation of the clock rate recovery circuit shown in FIG. 2.

The transmission system shown in FIG. 1 comprises a transmitter 1, a receiver 2, and a transmission channel 3 connecting the transmitter to the receiver.

The transmitter 1 comprises:

a data source 4 supplying binary symbols at a binary rate $1/T$;

a scrambler 5 connected to the output of the data source 4;

a coder 6 connected after the scrambler 5; and a modulator circuit 7.

The scrambler 5 performs modulo-2 addition between the data from the data source 4 and binary signals in a pseudo-random sequence. Its structure and operation are well known. It is sufficient here to recall that its takes advantage of a property of the spectral characteristics of a string of pulses, namely the property of increasing spectral line density with increasing irregularity in the arrival of pulses, which irregularity causes the pulses to appear like a noise signal. This increase in spectral line density is a very useful property since it facilitates recovery of the clock rate.

The coder 6 shapes the binary signal to make it suitable for single side band amplitude modulation. Various possible forms of coder are available, of which the most common is known as a clsss IV partial response coder. Such a coder is described in an article by E. R. Kretzmer entitled "Generalization of a technique for binary data communication" published the journal I.E.-.E.E. Trans. Commu. Tech. COM 14, N° Feb. 1, 1966. This pulse shaping makes it possible to attain the Nyquist rate of 2 symbols per pass band Hz. It is also well adapted to single side band amplitude modulation since it gives rise to a signal having little energy around the null frequency. In the rest of this description, it will be supposed that this type of pulse shaping is used, although it must be understood that it is not the only possible type that could be used.

The modulation circuit 7 performs single side band amplitude modulation and, as is often the case, it adds a low level carrier frequency pilot signal to the single side band modulated signal.

The receiver comprises:

a carrier recovery circuit 8 connected to its signal input;

a demodulator 9 connected to the signal input and to the output of the carrier recovery circuit 8 to supply the demodulated received signal;

a clock rate recovery circuit 10 connected to the output of the demodulator;

an equaliser 11 connected to the output of the demodulator and receiving the recovered clock rate;

a decoder 12 connected to the output of the equaliser 11; and an unscrambler 13 connected to the output of the decoder 12 and supplying a reproduction of the signal delivered by the data source 4.

The carrier recovery circuit 8 operates on the pilot wave in the received signal, and such circuits usually receive a phase error signal from the equaliser.

The demodulator 9 is a synchronous demodulator.

The clock rate recovery circuit 10 serves to retrieve the frequency of the data rate of the source 4 from the demodulated received signal.

The purpose of the equaliser 11 is to correct amplitude distortion and group propagation delay distortion attributable to the transmission channel. Its transmission characteristic is the inverse of that of the channel 3 so as to obtain an overall response which is flat in amplitude and linear in phase. In general it is self-adaptive and implemented in digital form, operating on samples of the signal sampled at the rate delivered by the clock rate recovery circuit.

The decoder 12 serves to reconstitute the signal into binary form and the unscrambler 13 to reconstitute binary signals identical to those delivered by the data source 4. They are likewise driven by the clock rate recovery circuit 10.

Except for the demodulator and the clock rate recovery circuit, the various circuits mentioned above will not be described in detail. They are not directly concerned with the invention and their implementation is well known in the art.

In prior art transmission systems the synchronous demodulator is generally constituted by a multiplier which multiplies together the received signal and the carrier supplied by the carrier recovery circuit 8, followed by a low pass filter to remove unwanted components from the desired signal. The clock rate recovery circuit comprises a rectifier connected to the output of the demodulator and followed either by a filter or by a phase locked loop, said filter or loop being centred on the frequency of $1/T$ corresponding to the clock rate.

The rectifier's non-linear processing of the base band signal delivered by the demodulator produces a sprectral line at the clock frequency $1/T$ and in phase with the transmitter clock. Unfortunately, it is observed experimentally that the amplitude of the clock frequency spectral line depends on the phase difference between the transmitter carrier and the receiver carrier. FIG. 3 is a graph showing the variation of this amplitude as a function of the phase difference $\phi$ between the transmitter and receiver carriers. It shows that the said amplitude is at a maximum for zero phase difference and at a minimum for a phase difference of $\pm(\pi/2)$. When the phase shift $\phi$ is too far from zero the amplitude of the spectral line is too low for the clock rate to be recovered.

The clock rate recovery circuit shown in FIG. 2 does not suffer from this drawback. It is connected after a synchronous demodulator 9 which uses two carriers in quadrature. As shown in FIG. 2 the demodulator comprises two multipliers 20 and 21, each followed by a respective low pass filter 22 or 23. The multiplier 20 multiplies together the received signal e(t) (stripped of its carrier wave) and the carrier p(t) delivered by the carrier recovery circuit 8 (FIG. 1). The following low pass filter 22 removes unwanted components from the resulting product and delivers a signal $x_1(t)$ on an in-phase output 26. This signal $x_1(t)$ is the demodulated signal when the transmitter and receiver carriers are in phase. The other multiplier 21 multiplies together the received signal e(t) (stripped of its carrier wave) and the carrier p(t) as subjected to a $(\pi/2)$ phase delay by a phase shifter 25. The following low pass filter 23 removes unwanted components from the resulting product and delivers a signal $x_2(t)$ at a quadrature output 27.

The clock rate recovery circuit per se 10 comprises, as shown in FIG. 2:

a first full wave rectifier 30 with its input connected to the in-phase output 26 of the modulator 9;

a second full wave rectifier 31 with its input connected to the quadrature output 27 of the modulator 9 using two carriers in quadrature;

a first on/off limiter 32 connected after the first rectifier 30 and delivering a signal $x_1'(t)$;

a second on/off limiter 33 connected after the second rectifier 31 and delivering a signal $x_2'(t)$;

a first two input multiplier 34 having one input connected to the output of the first on/off limiter 32 and its other input connected to the output of a voltage controlled oscillator 39;

a second two input multiplier 35 having one input connected to the output of the second on/off limiter 33 and its other input connected to the output of the voltage controlled oscillator 39;

a first low pass filter 36 connected to the output of the first multiplier 34;

a second low pass filter 37 connected to the output of the second multiplier 35;

a two input summing circuit 38 having one input connected to the output of the first low pass filter 36 and its other input connected to the output of the second low pass filter; and the said voltage controlled oscillator 39 having its control input connected to the output of the summing circuit 38 and having its output connected to one of the inputs of both the first and the second multipliers.

The voltage controlled oscillator 39 delivers a rectangular signal whose frequency is variable over a narrow range of frequencies around the frequency $1/T$ as a function of the signal applied to its control input by the summing circuit 38.

The first and second multipliers 34 and 35 are two input "exclusive-or" logic gates.

Figure 4:
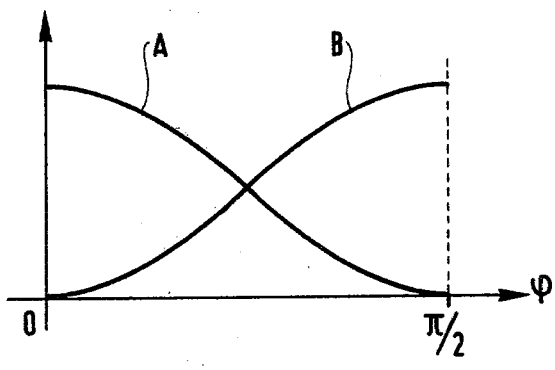

The in-phase output 26 of the demodulator 9 supplies a signal $x_1(t)$ which corresponds to the demodulated signal obtained by a synchronous demodulator using a single carrier. The rectifier 30 serves in known manner to cause a spectral line at the frequency $1/T$ to appear in the signal $x_1(t)$. This spectral line is in phase with the transmitter clock and its amplitude varies with the angle $\phi$ of the phase difference between the transmitter and receiver carriers, according to the law shown in FIG. 4 by a curve A analogous to the curve shown in FIG. 3. The on/off limiter 32 has an adjustable threshold set for obtaining maximum amplitude in the spectral line at the frequency $1/T$ in the signal $x_1'(t)$.

The quadrature output 2 of the demodulator 9 supplies a signal $x_2(t)$ which corresponds to the demodulated signal obtained by a synchronous demodulator using a single carrier which is shifted by a phase angle $\Phi = \phi - (\pi/2)$ with respect to the transmitter carrier. As for the signal $x_1(t)$, the rectifier 31 serves to cause a spectral line at the frequency $1/T$ to appear. This spectral line is in phase with the transmitter clock and its amplitude varies with the angle Φ of the phase difference between the transmitter and receiver carriers, according to a law which can be deduced from that shown in FIG. 3 by replacing φ with Φ which gives the curve B of FIG.4, since $\Phi = \phi - (\pi/2)$. The signals $x_1'(t)$ and $x_2'(t)$ both have spectral lines at the frequency 1/T but their amplitudes vary in opposite directions with varying phase shift φ between the transmitter and receiver carriers. Simultaneous use of both of these signals $x_1(t)$ and $x_2(t)$ thus makes the circuit independent of the phase difference φ between the transmitter and receiver carriers. Each of these signals is applied to a distinct phase comparator constituted by the multiplier 34 followed by the low pass filter 36 or by the multiplier 35 followed by the low pass filter 37. The DC voltages delivered by these comparators are added by the summing circuit 38 and applied to the control input of the voltage controlled oscillator 39 in the manner used for phase loops.

Without going beyond the scope of the invention, it is possible to modify certain arrangements or to replace certain equivalent means. In particular the on/off limiters 32 and 33 could be omitted and analog multipliers used.

I claim:

1. A clock rate recovery circuit for a data transmission system using linear modulation and including a receiver with a synchronous demodulator (9) having two carriers in quadrature and having two outputs, namely an in-phase output (26) and a quadrature output (27), the said circuit comprising:

a first rectifier (30) connected to the in-phase output (20) of the demodulator (9);

a second rectifier (31) connected to the quadrature output (27) of the demodulator (9);

a first two-input/one-output multiplier (34) having one of its inputs connected to the output of the first rectifier (30) and its other input connected to the output of a voltage-controlled oscillator (39);

a second two-input/one-output multiplier (35) having one of its inputs connected to the output of the second rectifier (31) and its other input connected to the output of the said voltage-controlled oscillator (39);

a first low pass filter (36) connected to the output of the first multiplier (34);

a second low pass filter (37) connected to the output of the second multiplier (35);

a two-input/one-output summing circuit (38) having one of its inputs connected to the output of the first low pass filter (35) and its other input connected to the output of the second low pass filter (37); and the said voltage-controlled oscillator (39) having a control input connected to the output of the summing circuit (38) and an output delivering a signal at the frequency of the recovered clock rate and connected to one of the inputs of both the first and the second multipliers (34 and 35).

2. A circuit according to claim 1, wherein the first and second rectifiers (30 and 31) are full wave rectifiers.

3. A circuit according to claim 1, wherein an on/off limiter (32 and 33) is inserted between the first rectifier (30) and the first multiplier (34) and also between the second rectifier (31) and the second multiplier (35), and in that the first and second multipliers (34,35) are two input "exclusive-or" logic gates.

* * * * *